United States Patent [19]

Scales

[11] Patent Number: 4,856,028
[45] Date of Patent: Aug. 8, 1989

[54] LOW DATA RATE COMMUNICATIONS LINK

[75] Inventor: Walter C. Scales, Honolulu, Hi.

[73] Assignee: The MITRE Corporation, Bedford, Mass.

[21] Appl. No.: 855,678

[22] Filed: Apr. 25, 1986

[51] Int. Cl.[4] .................. H04L 27/06; H04B 1/10
[52] U.S. Cl. ........................... 375/97; 375/118; 455/260; 331/1 R; 370/74
[58] Field of Search ............... 375/97, 102, 103, 118, 375/119, 120, 101; 455/260, 32; 370/74, 93; 331/16, 1 R; 324/77 F

[56] References Cited

U.S. PATENT DOCUMENTS

| | | | |
|---|---|---|---|
| 3,379,995 | 4/1968 | Koontz et al. | 331/16 |
| 4,271,524 | 6/1981 | Goodman et al. | 370/93 |
| 4,348,772 | 9/1982 | Leland et al. | 331/1 R |
| 4,445,224 | 4/1984 | Ihira et al. | 375/120 |
| 4,479,249 | 10/1984 | Geesen et al. | 455/260 |
| 4,514,855 | 4/1985 | Lang et al. | 375/118 |

Primary Examiner—Robert L. Griffin
Assistant Examiner—Marianne Huseman
Attorney, Agent, or Firm—Wolf, Greenfield & Sacks

[57] ABSTRACT

The data link includes a phase noise compensator to eliminate phase noise resulting from microwave frequency sources on a communications satellite. In addition, Fourier analyzers are utilized to determine the frequency of received signals having low carrier-to-noise density. The combination of the phase noise compensator and the Fourier analyzers permits data rates on the order of 50 to 400 bits per second to provide economically attractive communication links with aircraft over ocean areas.

3 Claims, 3 Drawing Sheets 4,856,028

LOW DATA RATE COMMUNICATIONS LINK

BACKGROUND OF THE INVENTION

This invention relates to communication links, and more particularly to a two-way data link using communications satellites to provide low rate data communication with aircraft.

There has been a long-standing interest in the civil aviation community in ways to improve air/ground communications over ocean areas. Communications satellites offer a potential to satisfy this need. However, previous efforts to provide voice and medium-speed data service to civil aviation on the basis of a dedicated satellite system have not come to fruition primarily because of cost.

It has been estimated that the average data rate per aircraft required for oceanic air traffic control (ATC) is on the order of 4 bits per second or less. For a number of reasons, data rates this low may not be practical. Generally, the use of data rates below 1200 bits per second with the corresponding low power and low carrier-to-noise density ($C/N_0$) levels is subject to two major limitations. First of all, carrier frequency acquisition using conventional methods requires much more search time as the $C/N_0$ decreases. This increased search time reduces the effectiveness of the system by requiring long carrier preambles in which no information is transmitted. The carrier acquisition problem is exacerbated in aeronautical applications where the initial frequency uncertainty is high because of the possibility of high Doppler shifts due to aircraft motion. Secondly, as the data rate and $C/N_0$ are lowered, system phase noise, most of which is due to microwave frequency sources on a communications satellite, becomes an increasingly significant source of performance degradation.

It is therefore an object of the present invention to provide a low data rate communications link which eliminates the need for long carrier preambles and reduces system phase noise.

Another object of the invention is a low data rate communications link having lower power and antenna gain requirements.

Yet another object of the invention is such a communications link which provides economically attractive communications over ocean areas.

Still another object of the invention is a communications link in which communication satellites and earth stations are shared between aeronautical users and other mobile users.

SUMMARY OF THE INVENTION

These and other objects of the invention are achieved in a low data rate communication system including a receiver responsive to an electromagnetic radiation signal. A phase noise compensator is connected to receive the signal from the receiver. At least one Fourier analyzer receives the signal from the phase noise compensator to determine the frequency of the received signal. Demodulators including automatic frequency control circuits receive signals both from the phase noise compensator and the Fourier analyzer, the signal from the analyzer adapted to initialize the automatic frequency control circuit of the demodulator. In a preferred embodiment, a plurality of demodulators are provided each of which is tuned to a different frequency corresponding to a particular data channel frequency of the communications link. The electromagnetic radiation signal includes an unmodulated pilot signal and the phase noise compensator includes band pass filters adapted to separate the pilot signal from the data portion of the signal. A phase lock loop circuit is provided for tracking phase variations of the pilot signal, and a mixer is provided for subtracting the phase of the pilot signal from the phase of the data portion of the electromagnetic radiation signal to reduce phase jitter.

Air-to-ground data transfers are accomplished in two different ways. Short, one-time messages may be passed via a random access request channel. These transmissions are acknowledged by the earth station terminal. Long messages and periodic data transfers are performed on N data channels. Transmissions on the data channels are staged so that the carrier preambles of the various messages do not overlap in time. However, synchronization and data portions of messages on separate data channels may overlap in time.

BRIEF DESCRIPTION OF THE DRAWING

The invention disclosed herein will be understood better with reference to the drawing of which.

DESCRIPTION OF THE PREFERRED EMBODIMENT

Figure 1:
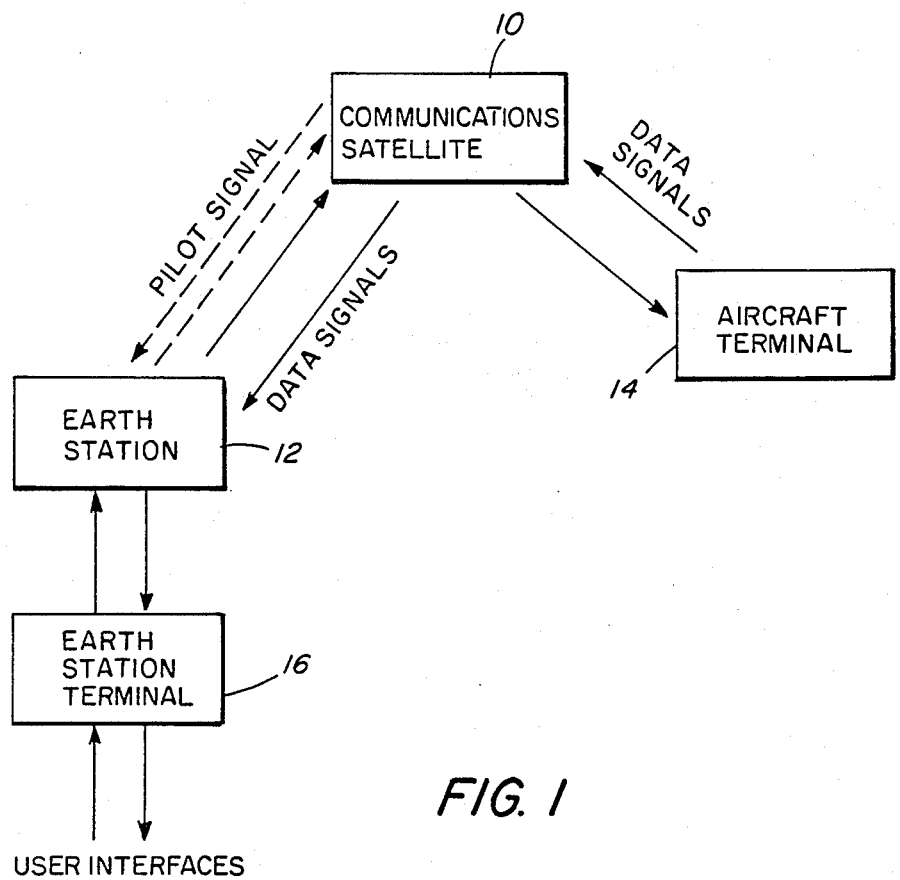
FIG. 1 is a block diagram of the overall system configuration.

With reference first to FIG. 1, the present communications system utilizes a communications satellite 10 which links an earth station 12 with an aircraft terminal 14. The earth station 12 is connected with an earth station terminal 16 for the sending and receiving of data. In addition to data signals as shown by the sold lines in FIG. 1, pilot signals indicated by the dashed lines are transmitted between the earth station 12 and the communications satellite 10. As will be discussed below, the unmodulated pilot signal is used for phase noise compensation.

Ground-to-air transmissions, that is, transmissions from the earth station terminal 16 to the aircraft terminal 14 are composed of periodic timing (or synchronization sequences) and data transmissions addressed to particular aircraft or groups of aircraft. When an aircraft terminal is initially turned on, it searches for and acquires the earth station carrier and timing sequence. Having done this, it continuously searches for its own address or identification number in the address fields of the ground-to-air transmissions. When it detects its own address it decodes and stores the message.

Air-to-ground data transfers can be accomplished in two different ways. Short, one-time messages may be passed via a random access request channel. Such transmissions are acknowledged by the earth station terminal 16. Long messages and periodic data transfers are performed on N data channels. Aircraft may transmit on the data channels only after receiving a channel assignment and a time slot assignment from the earth station terminal 16. The channel assignment defines the setting of the aircraft terminal's transmit frequency synthesizer or channel selector. The time slot defines a starting time of the air-to-ground transmission relative to the ground-to-air synchronization sequence. The transmission can be as long as necessary to accomplished the required data transfer.

Figure 2:
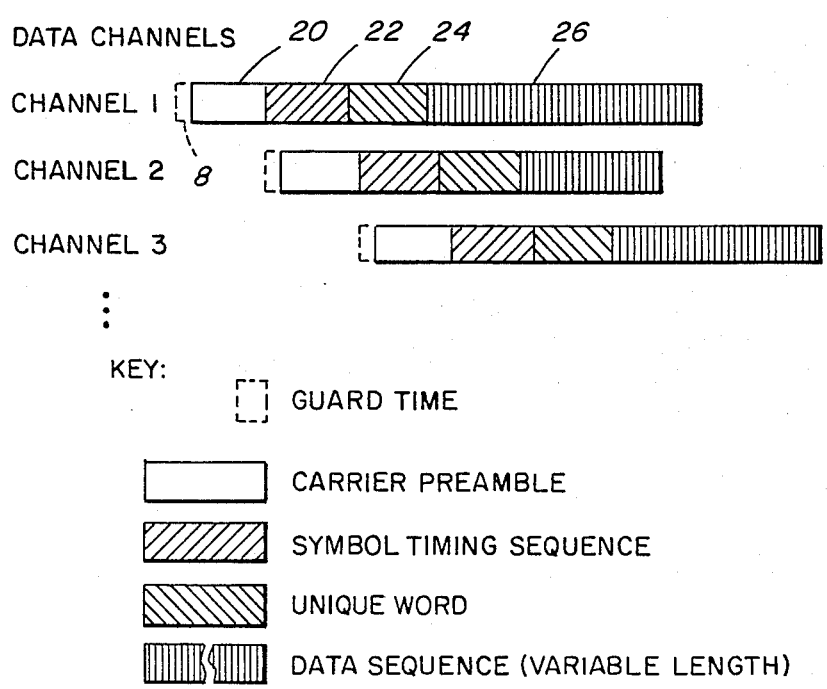
FIG. 2 is a schematic illustration of a multiple access protocol.

FIG. 2 illustrates a multiple access protocol for use in the present communications system. In FIG. 2, three communication channels, namely channel 1, channel 2 and chennel 3 are shown. Each data channel includes a guard time 18, a carrier preamble 20, a symbol timing sequence 22, a unique word 24 and a data sequence 26 of variable length. Any aircraft terminal may transmit short messages on the random access request channel at any time. These messages contain provision for error detection so that collisions between messages from different aircraft terminals can be detected at the earth station terminal 16. If the aircraft terminal 14 does not receive an acknowledgment to a request message, it retransmits the message after a random delay to prevent continued collisions. As shown in FIG. 2, transmissions on the data channels are staged so that the carrier preambles of the various messaes do not overlap in time.

Figure 3:
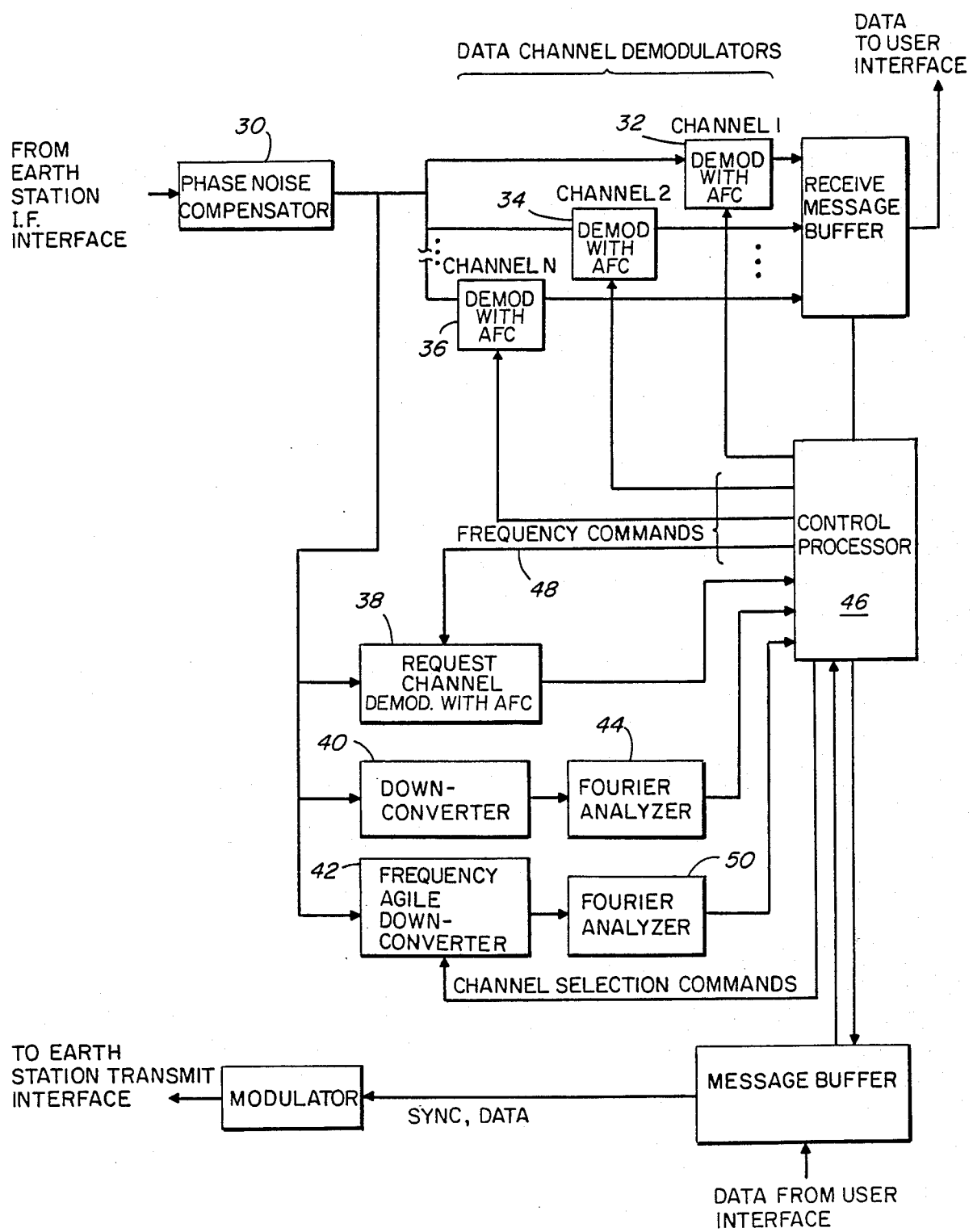
FIG. 3 is a block diagram of an earth station terminal for use in the present invention.

Details of the earth station terminal 16 of FIG. 1 will now be described in conjunction with FIG. 3. Intermediate frequency (i.f.) signals entering the earth station terminal 16 from the earth station 12 are first corrected for phase jitter introduced by the satellite 10 transponder by means of a phase noise compensator 30. The phase noise compensator 30 will be described below in conjunction with FIG. 4. The output of the phase noise compensator 30 is connected to N data channel demodulators 32, 34 and 36, each of which is tuned to a different frequency corresponding to a particular data channel frequency. The output from the phase noise compensator 30 is also connected to a request channel demodulator 38 and to downconverters 40 and 42. The downconverter 40 shifts the request channel (including the full range of possible Doppler shifts) to an audio band that is subjected to Fourier analysis in a Fourier analyzer 44 to detect the carrier preamble of the incoming signals and to determine their frequencies. When the frequencies have been determined, they are passed to the request channel demodulator 38 via a control processor 46 along a signal path 48. The request channel demodulator 38 includes conventional automatic frequency control that is initialized by the Fourier-derived frequency command.

The Fourier analyzer 44 measures the energy in each of M contiguous frequency sub-bands spanning the band of frequency uncertainty associated with the received signals. It selects the sub-band containing the largest energylevel and tests that level with respect to a fixed or adaptive signal detection threshold. If the highest energy level exceeds the signal threshold, the center frequency of the corresponding sub-band is passed to the request channel demodulator 38 via the control processor 46. If the highest energy level fails to exceed the signal threshold, the Fourier analyzer 44 repeats the sub-band energy measurements until a signal is detected.

The time period over which the Fourier analyzer 44 integrates energy for each set of M measurements is approximately half of the duration of the carrier preamble on the request channel. By repeated measurements, a carrier preamble can be detected quickly and with high reliability.

The downconverter 42 is a frequency-agile downconverter that can be rapidly tuned to any data channel by commands from the control processor 46. Once tuned to that channel, it functions like the request channel down-converter 38 providing an audio-frequency band to a data channel Fourier analyzer 50 which determines the carrier frequency from the downconverter 42 and passes it to the automatic frequency control of the appropriate data channel demodulator 32, 34, 36, etc., via the control processor 46 for initialization.

The Fourier analyzer 50 is functionally similar to the Fourier analyzer 44. In normal operation, the Fourier analyzer 44 provides estimates of the frequencies of the received request channel signals; the Fourier analyzer 50 provides estimates of the frequencies of the data channel signals. Because the arrival times of the received data channel signals are known a priori (except for uncertainties associated with an unknown propagation delay) the Fourier analyzer 50 can measure energy over a time interval equal to or slightly shorter than the duration of the carrier preambles 20 of the data channel signals.

Figure 4:
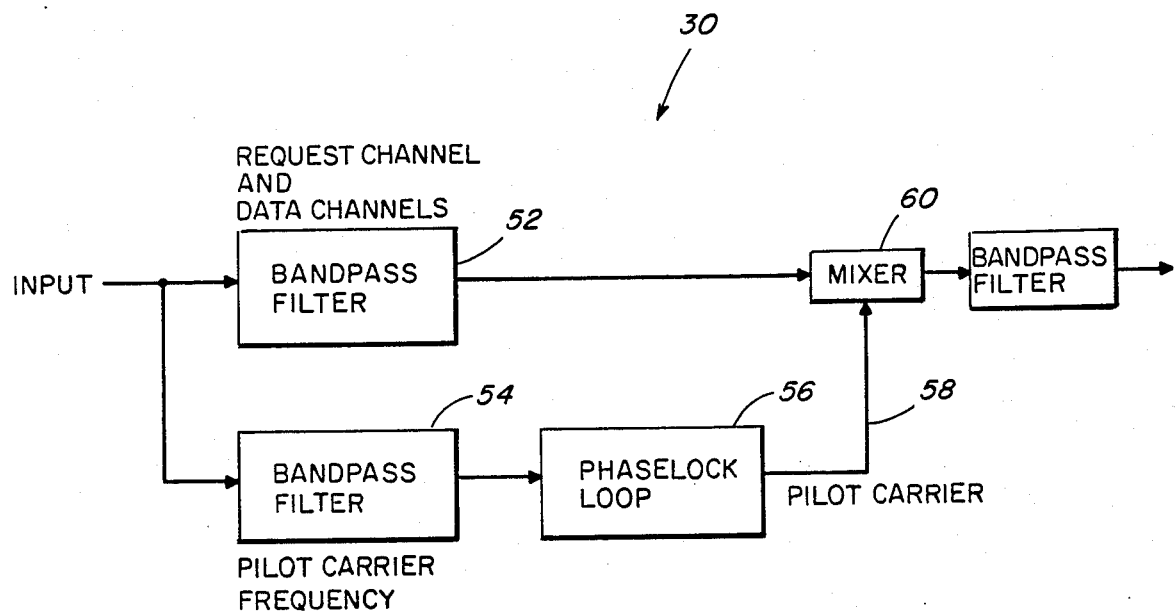
FIG. 4 is a block diagram of the phase noise compensator disclosed herein.

The phase noise compensator 30 will now be described with reference to FIG. 4. As stated above with reference to Fig. 1, phase noise generated in a communications satellite is compensated by transmitting an unmodulated pilot signal through a satellite transponder. This pilot signal may be a system pilot also used for automatic control of the satellite translation frequencies. As shown in FIG. 4, band pass filters 52 and 54 separate the pilot channel from the request and data channel signals. A conventional phase lock loop 56 tracks the phase variations of the pilot signal. The received pilot carrier 58 is used as a local oscillator to produce a difference frequency, which becomes a second intermediate frequency. The pilot carrier signal 58 is combined with the output of the band pass filter 52 in a mixer 60. Because the phase of the recovered pilot signal 58 is subtracted from the phase of the data signals, the satellite-induced phase jitter is significantly reduced.

It is thus seen that the objects of this invention have been achieved in that there has been disclosed communications apparatus which employs Fourier analyzers to determine the frequency of the received carrier signal and a phase noise compensator to reduce phase noise. In this way, low data rate signals can be used to provide economically attractive communications over ocean areas with reduced power and antenna gain requirements. Furthermore, the present system utilizes a hybrid time-frequency multiple access technique to provide the cost advantages of frequency division multiple access without requiring a separate Fourier analyzer for each frequency channel.

It is recognized that modifications and variations of the present invention will occur to those skilled in the art and it is intended that all such modifications and variations be included within the scope of the appended claims.

What is claimed is:

1. Low data rate communications system comprising:
   a receiver responsive to an electromagnetic radiation signal including a data portion and a pilot signal portion;
   a phase noise compensator connected to receive the electromagnetic radiation signal from the receiver;
   at least one non-scanning Fourier analyzer connected in series to the output of said phase noise compensator to determine the frequency of the signal; and
   at least one demodulator including an automatic frequency control circuit connected to receive signals from the phase noise compensator and the Fourier analyzer, the signal from the analyzer adapted to initialize the automatic frequency control circuit of the demodulator.

2. The system of claim 1 including a plurality of said at least one demodulators each tuned to a different frequency corresponding to a particular data channel frequency of the communication system.

3. The system of claim 1 wherein the phase noise compensator includes:
 (1) band pass filters adapted to separate the pilot signal from the data portion of the signal;
 (2) phase lock loop means for tracking phase variations of the pilot signal; and
 (3) mixer means for subtracting the phase of the pilot signal from the phase of the data portion of the signal to reduce phase jitter.

* * * * *